United States Patent Office 2,843,669
Patented July 15, 1958

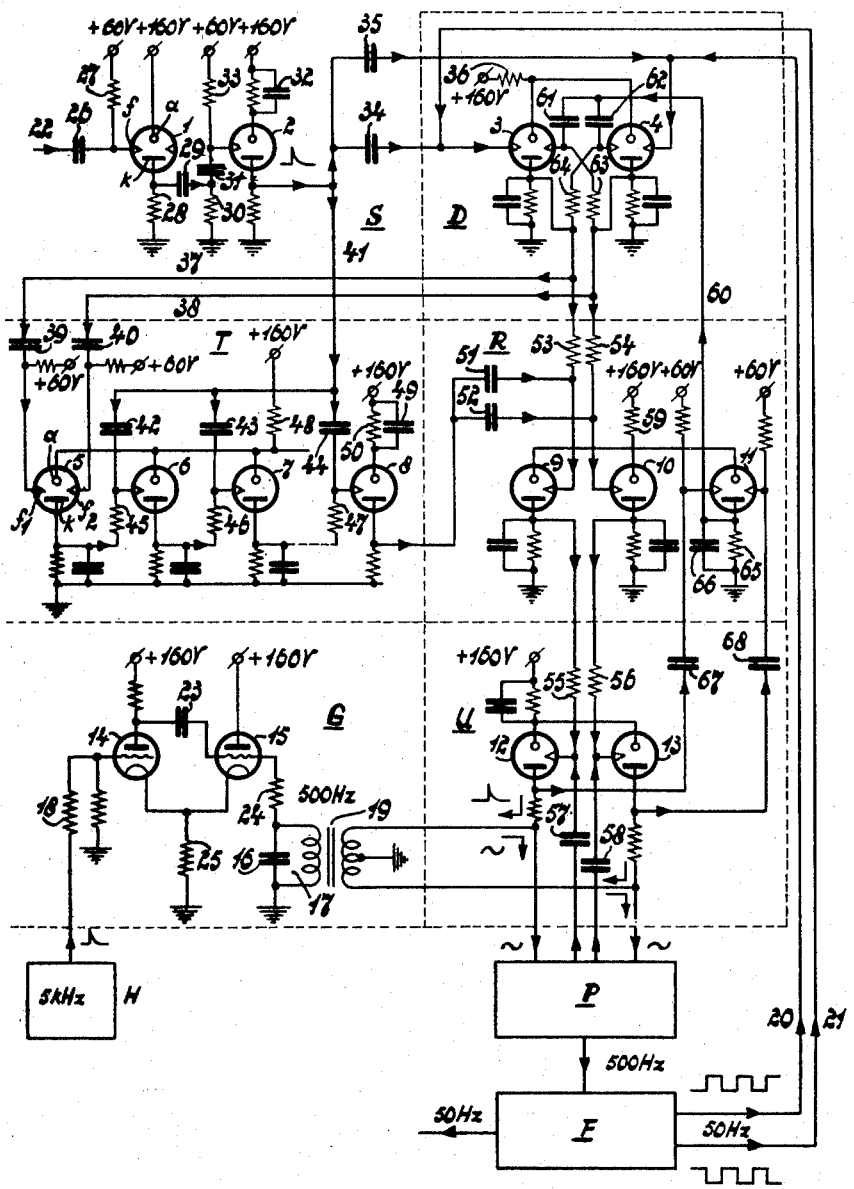

2,843,669

SYNCHRONIZED GENERATOR

Willem Six, Rudolf Louis Wittebol, and Regnerus Aginus Koolhof, Hilversum, Netherlands, assignors, by mesne assignments, to North American Philips Company, Inc., New York, N. Y., a corporation of Delaware Application October 26, 1954, Serial No. 464,838

Claims priority, application Netherlands October 27, 1953

3 Claims. (Cl. 178—69.5)

This invention relates to a generator of electrical signals which is adapted to be synchronized in a particular phase by synchronizing signals.

Such a generator may be used, for example, with the rhythmical transmission of telegraph signals by a radiographic agency. At the receiver end there must be available an electrical oscillation which is synchronized in phase with the transmitter in order to fix the beginning and the end of the telegraph signs and their elements. If the generator which produces this oscillation has adopted the correct phase, it is desirable that it should continue to operate in this phase when the reception of the synchronizing telegraph signs is interrupted, for example, due to fading, which may sometimes last a comparatively long time. The generator must then be substantially in synchronism with the transmitter, when the signals appear again. The generator in itself must therefore be very stable.

A circuit arrangement is known comprising a phase discriminator which compares the phase of the oscillation produced by a generator with the phase of the synchronizing signals and which acts upon the generator in an accelerating or delaying sense in accordance with the sense of the phase deviation, for example, by detuning the generator by electrical means with the aid of a reactance tube. This circuit arrangement has a disadvantage in that the natural frequency also varies with the variable element, for example, the reactance tube controlled by the control-voltage, and varies with any change in the mutual conductance of the tube due to aging, etc., and with the supply voltages and the like, so that, in the absence of a synchronized signal, the natural frequency is not absolutely determined. In general, the frequency constancy of such a controlled generator can, in principle, not be rendered as great in practice as that of a noncontrolled generator, for example, a quartz-controlled generator, the frequency of which is determined substantially only by the natural frequency of the quartz crystal and does not vary with tube properties, supply voltages and so on.

In the arrangement according to the invention, the generator is synchronized by a "free-running" auxiliary generator, the frequency of which is at least approximately a higher harmonic of the natural frequency of the first generator. The term "free-running" is to be understood to mean herein that the auxiliary generator is not correlated in some way or other with the synchronizing signals nor is it acted upon by the phase discriminator. Since the natural frequency of the auxiliary generator is equal to a multiple of the natural frequency of the first generator, the latter may be synchronized, in principle, in various phases, i. e., in as many different phases as the amount of the ratio between the said frequencies. If the phase of the first generator deviates from the desired phase which is determined by the synchronizing signals, in this case the telegraph signals, the phase discriminator acts upon the first generator in an accelerating or delaying sense, so that the synchronization coupling mechanism with the auxiliary generator is interrupted and the first generator is synchronized in a different phase with respect to the auxiliary generator.

In principle, the arrangement could be such that the phase discriminator, by means of a control-voltage proportional to the phase deviation, detunes the generator. Since the auxiliary generator and the synchronizing signals are not correlated, the phase deviation and hence the control-voltage increase until the detuning reaches a value such that the phase of the main generator is shifted abruptly.

The corrective influence is exerted preferably in a manner such that the phase discriminator supplies a positive or a negative pulse in accordance with the sense of the phase deviation to a circuit determining the natural frequency of the first generator at an instant such that the oscillation across this circuit is subjected to a phase shift, so that the generator is synchronized in a different period of the auxiliary generator.

In practice it may occur that during the occurrence of fading interference signals, for example, atmospheric interferences or noise, take over the synchronizing effect of the telegraph signals. Since, in general, these interference signals are statistically distributed arbitrarily in time, their effect will, in general, be such that the phase discriminator either accelerates or delays the generator. It could therefore be expected that the effect of the interference signals on the phase of the generator is on an average equal to zero. However, the probability calculus teaches that if, for example, a deviation of an arbitrary sign occurs 1000 times, it is quite probable that, for example, 600 times a positive and 400 times a negative deviation is found, so that in these conditions the phase of the generator would vary 200 times more frequently in a positive than in a negative sense; in this case the phase would vary, of course, in an inadmissible manner. The arrangement is therefore preferably such that the phase discriminator must have a predetermined successive number of deviations, for example, 10 deviations in the same sense, before the phase of the generator is varied. It is little probable that the interference signals produce several consecutive times a phase deviation in the same sense. However, if a systematic deviation occurs with respect to the telegraph signals, the discriminator will, of course, always accommodate a deviation in the same sense, until the deviation is obviated.

The invention will now be described more fully with reference to the accompanying drawing, in which the single figure is a schematic electrical diagram of a preferred embodiment of the invention.

The drawing shows diagrammatically a generator circuit which may be used in a receiver of a system for the rhythmical transmission of telegraph signals by radiographic agency. The direction in which various control-voltages are operative is indicated in the drawing by arrows. The circuit comprises a plurality of gas-filled tubes 1 to 13, each comprising a cold cathode $k$, an anode $a$ and one or two ignition electrodes $f$, indicated, for example, for the tubes 1 and 5. The vacuum tubes 14 and 15 are included in the oscillation generator circuit G, the natural frequency of which is determined by the tuned circuit 16, 17 and is equal to 500 cycles. The generator G is synchronized by the auxiliary generator H, which is controlled by a crystal and supplies synchronizing pulses with a strictly constant frequency of 5,000 cycles across the resistor 18 to the control-grid of tube 14. The phase of the generator G may be varied in a manner to be described hereinafter by means of the device U, which is coupled by way of a transformer 19 to the tuned circuit 16, 17. The transformer 19 supplies the output voltage of the generator G to the pulse producer P, which converts the sine voltage into a square-wave voltage of 500 cycles and supplies it to the frequency-dividing stage F. The dividing stage F which may, for example, be constructed in the form of a counting circuit, supplies square-wave voltages with a frequency of 50 cycles in phase opposition across the conductors 20 and 21 to the phase discriminator D, which compares the phase of these voltages which the phase of the synchronizing pulses derived from the incoming telegraph signals by the device S. As stated above, it may occur in the case of fading that due to the prevailing interference signals the phase discriminator states a fictive phase difference from the transmitter. In order to prevent these interference signals from disturbing the operation of the generator, the arrangement is such that the device U does not vary the phase of the generator G each time when the phase discriminator D states a phase difference, but the device U can become operative only after the counting circuit T has generated a signal in response to a predetermined number of phase deviations with the same polarity occurring in succession, in which case the counting circuit T supplies a control-pulse to the device R which causes the device U to respond at a suitable instant.

The arrangement shown operates as follows:

At a given instant, tube 14 is cut off and tube 15 is conductive, while the grid voltage of tube 15 drops under the control of the tuned circuit 16, 17. Then the voltage at the cathodes of these tubes drops and the effective grid voltage of tube 14 increases. On the latter voltage there is superimposed the synchronizing pulses from the generator H. At the instant when this voltage exceeds the critical voltage at which tube 14 is just at cut-off, the tube 14 becomes conductive and the capacitor 23 transmits a negative pulse to the control-grid of tube 15 and, through a resistor 24, to the tuned circuit 16, 17. Thus the tube 15 is cut off. After a short time the voltage at the control-grid of tube 15 increases again, tube 15 becoming conductive and tube 14 being cut off due to the presence of the resistor 25 in the cathode circuit. The instant when tube 14 becomes conductive and supplies a feeding pulse to the circuit 16, 17, is determined by the synchronizing pulses from generator H; these instants will normally coincide with each 10th pulse.

When the device U becomes operative, one of the gas-filled tubes 12 or 13 ignites in accordance with the phase difference stated by the discriminator; on an approximation this will occur at an instant when the circuit voltage of the tuned circuit 16, 17 passes the zero value. Since one of these tubes becomes conductive, the transformer 19 transmits a pulse to the tuned circuit, so that an additional sine oscillation is superimposed in this circuit on the oscillation already prevailing in this circuit, the first oscillation having a phase difference of 90° relative to the latter. Owing to this additional voltage across the circuit the phase of the oscillation is shifted forwards or backwards. This phase shift has the effect that the instant when tube 14 becomes conductive it leads or lags by one period of the auxiliary generator H, i. e., at the 9th or the 11th pulse, since the effective grid voltage of tube 14 reaches the critical value sooner or later than normal.

The incoming telegraph signals are supplied through the conductor 22 and the capacitor 26 to the ignition electrode of tube 1. Owing to the differentiating effect of the potentiometer 26, 27, a positive pulse appears at each transition from negative to positive in the telegraph signals and a negative pulse at each transition from positive to negative at the ignition electrode of tube 1; only the positive pulses can be operative and ignite the tube. The cathode circuit of tube 1 includes the network 28, 29, 30 so that the tube extinguishes independently and can ignite again only after a period of 150 msec. Pulses which occur at the ignitron electrode of tube 1 within this period remain, consequently, inoperative. When tube 1 ignites, capacitors 29 and 31 transmit a positive pulse to the ignition electrode of tube 2, which extinguishes after a short time owing to the presence of the resistor 33 in the anode circuit, shunted by the capacitor 32 and transmits a short synchronizing pulse through capacitors 34 and 35 to the ignition electrodes of tubes 3 and 4 of the discriminator D.

As stated above, the voltage dividing stage F supplies squarewave voltages with a frequency of 50 cycles in phase opposition through the conductors 20 and 21 to the ignition electrodes of tubes 3 and 4. These pulses produce such a bias voltage at the ignition electrodes of tubes 3 and 4 that one of these tubes can ignite owing to the synchronizing pulses, when the bias voltage at its ignition electrode has a comparatively high value at that instant. If, for example, the voltage of the voltage dividing stage F lags in time with respect to the synchronizing pulses derived from the telegraph signals, tube 3 ignites and it remains conductive as long as this phase condition is maintained or else the tube extinguishes under the control of tube 11, as will be described hereinafter. Conversely, tube 4 ignites if the voltage of the dividing stage F leads in time with respect to the synchronizing pulses. If one of the tubes 3 or 4 ignites, the other tube extinguishes automatically, since their anode circuits include a common resistor 36. At the same time, owing to the increase in cathode voltage of the igniting tube, a positive pulse is transmitted at that instant across the conductors 37 or 38 and the capacitor 39 or 40 to an ignition electrode $f_1$ or $f_2$ of tube 5, so that tube 5 ignites. The synchronizing pulses are also supplied through a conductor 41 to the counting circuit T and therein supplied through capacitors 42, 43, 44 to ignition electrodes of the gas-filled tubes 6, 7 and 8. The counting circuit is arranged in known manner to be such that the ignition electrode of each further tube is coupled through a resistor 45, 46, 47 to the cathode of the preceding tube, so that the ignition electrode of a tube next to a conductive tube has a higher bias voltage than the other tubes of the counting circuit. Thus a next following synchronizing pulse will ignite a next following tube. Since the tubes 5, 6, 7 have a common anode resistor 48, the ignition of one of these tubes causes a further tube which happens to be conductive to extinguish. As long as synchronizing pulses are received, exhibiting the same phase relationship with the voltage supplied by the dividing stage F to the discriminator, either tube 3 or tube 4 remains conductive and the counting circuit counts the synchronizing pulses, until the last tube 8 of the counting circuit ignites. This tube extinguishes independently, since the anode circuit includes a resistor 50 having a high value of resistance, shunted by the capacitor 49. If one of the tubes 3 or 4 would ignite before tube 8 ignites, for example, if the phase condition of the voltages supplied by the discriminator D changes, or else under the control of tube 11, then the first tube of the counting circuit will ignite, so that a further tube of the counting circuit extinguishes and this circuit is returned into its initial position and has to start counting again. Thus tube 8 can ignite only if in immediate succession a sufficient number of phase deviations in the same sense, either positive or negative, has been stated by the discriminator D.

When tube 8 ignites, capacitors 51 and 52 transmit a positive pulse to the ignition electrodes of the tubes 9 and 10; these ignition electrodes are coupled through resistors 53 and 54 to the cathodes of the tubes 3 and 4, so that tube 9 ignites owing to the said pulses if at that instant tube 3 is conductive, which indicates that synchronizing pulses lead in time with respect to the square-wave voltage from the stage F, whereas conversely, tube 10 ignites if tube 4 is conductive, in which case the synchronizing pulses lag in time. When tube 9 or 10 ignites, one of the ignition electrodes of tubes 12 or 13, which are coupled through resistors 55 and 56, respectively, to the cathodes of tubes 9 and 10, respectively, obtains an increased bias voltage. The pulse producer P supplies a positive pulse to the ignition electrodes of tubes 12 and 13 at the instant when the voltage of the tuned circuit 16, 17 passes zero in a given phase, for example, in the ascending sense, across capacitors 57 and 58 so that one of these tubes ignites if at that instant one of the tubes 9 or 10 is conductive. When one of the tubes 12 or 13 ignites, a pulse is supplied in a manner described above to the tuned circuit 16, 17, so that the phase of the generator G is varied abruptly. At the same time the capacitor 67 or 68 transmits at that instant a positive pulse from the cathode of tube 12 or 13 to an ignition electrode of tube 11, so that this tube ignites. Thus tube 9 or 10, whichever is conductive at that instant, extinguishes, since the common anode circuit of tubes 9, 10 and 11 includes a common resistor 59. At the same time the conductor 60 supplies a positive pulse from the cathode of tube 11 through capacitors 61, 62 to ignition electrodes of the tubes 3 and 4. These ignition electrodes are coupled through the resistors 63 and 64 to the cathode of the other tube, so that the ignition electrode of the tube, which is not conductive at that instant, exhibits a higher bias voltage, so that at the ignition of tube 11 the nonconductive tube 3 or 4 will ignite, the other tube extinguishing and the first tube 5 of the counting circuit igniting. The tube 11 extinguishes independently, since the cathode circuit includes a resistor 65 having a high value of resistance, which is shunted by a capacitor 66.

While preferred embodiments of the invention have been shown and described, other embodiments and modifications thereof will occur to those skilled in the art and will fall within the scope of invention as defined in the following claims.

What is claimed is:

1. A synchronized generator comprising an oscillation generator, a source of synchronizing signals, a phase discriminator connected to compare the phase of said oscillations with that of said synchronizing signals and produce a corrective signal in accordance with the relative phases of said oscillation and said synchronizing signals, means connected to feed said corrective signal to said generator to accelerate or delay said oscillation in accordance with said corrective signal thereby achieving desired synchronization of said oscillation, a free-running auxiliary generator having a frequency substantially equal to a harmonic of the natural frequency of said oscillation generator, and means connected independently of said phase discriminator to synchronize said oscillation generator with said auxiliary generator whereby said oscillation generator continues to be substantially synchronized in the event that said synchronizing signals fail to occur.

2. A generator as claimed in claim 1, in which said corrective signal comprises pulses, in which said oscillation generator comprises a frequency-determining resonant circuit, and in which said means connected to feed the corrective signal to the oscillation generator comprises a phasing means for applying said pulses to said resonant circuit to produce an alternating signal therein which is out-of-phase with said oscillations.

3. A generator as claimed in claim 1, in which said synchronizing signals comprise pulses and said means connected to feed the corrective signal to the oscillation generator comprises a signal control device connected between said phase discriminator and said oscillation generator and having a control electrode, and including a pulse-counting circuit connected to receive and count said pulses and produce an output signal after receiving a predetermined number of consecutive input pulses having the same polarity, means connected to reset said counter circuit whenever said corrective signal changes polarity, and means connected to feed said output signal to said control electrode whereby said corrective signal is fed to said oscillation generator only when the corrective signal and output signal occur at the same time.

References Cited in the file of this patent
UNITED STATES PATENTS
2,655,556    Abelson  ---------------- Oct. 13, 1953

OTHER REFERENCES

Introduction to Color Television, Admiral Corp., Chicago, Ill., February 1954, pages 17 to 27. (Copy in Div. 16.)